United States Patent
Bahrami et al.

(10) Patent No.: US 11,550,937 B2
(45) Date of Patent: Jan. 10, 2023

(54) PRIVACY TRUSTWORTHINESS BASED API ACCESS

(71) Applicant: FUJITSU LIMITED, Kawasaki (JP)

(72) Inventors: Mehdi Bahrami, Santa Clara, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 733 days.

(21) Appl. No.: 16/440,656

(22) Filed: Jun. 13, 2019

(65) Prior Publication Data

US 2020/0394318 A1    Dec. 17, 2020

(51) Int. Cl.
- *G06F 21/31* (2013.01)
- *G06F 21/62* (2013.01)
- *G06F 16/958* (2019.01)
- *G06F 9/54* (2006.01)
- *G06N 5/02* (2006.01)

(52) U.S. Cl.
CPC .............. *G06F 21/62* (2013.01); *G06F 9/541* (2013.01); *G06F 16/986* (2019.01); *G06F 21/31* (2013.01); *G06N 5/022* (2013.01)

(58) Field of Classification Search
CPC ......... G06F 16/986; G06F 21/62; G06F 21/31
See application file for complete search history.

(56) References Cited

U.S. PATENT DOCUMENTS

| | | |
|---|---|---|
| 4,537,237 A | 8/1985 | Sepulveda et al. |
| 4,681,253 A | 7/1987 | Engelhardt |
| 4,901,730 A | 2/1990 | Vitori et al. |
| 5,016,571 A | 5/1991 | Totaro |
| 6,119,179 A | 9/2000 | Whitridge et al. |
| 6,327,535 B1 | 12/2001 | Evans et al. |
| 6,594,483 B2 | 7/2003 | Nykanen et al. |
| 6,970,947 B2 | 11/2005 | Ebling et al. |
| 7,032,168 B1 | 4/2006 | Gerace et al. |
| 7,096,029 B1 | 8/2006 | Parupudi et al. |
| 7,167,842 B1 | 1/2007 | Josephson, II et al. |
| 7,206,744 B2 | 4/2007 | Suryanaraya |
| 7,676,812 B2 | 3/2010 | Cabrera et al. |
| 7,707,036 B2 | 4/2010 | Suryanaraya |
| 7,784,224 B2 | 8/2010 | Peckham |
| 8,473,451 B1 | 6/2013 | Hakkani-Tur et al. |
| 8,560,610 B2 | 10/2013 | Lunt et al. |
| 8,602,080 B2 | 12/2013 | Abreu |
| 8,751,439 B2 | 6/2014 | Hakkani-Tur et al. |
| 8,806,652 B2 | 8/2014 | Bjones et al. |
| 8,825,757 B2 | 9/2014 | Lunt et al. |
| 8,887,066 B1 | 11/2014 | Deng et al. |
| 9,053,327 B2 | 6/2015 | Vandervort |
| 9,129,027 B1 * | 9/2015 | Hamedi ................ G06Q 30/02 |

(Continued)

*Primary Examiner* — Eliyah S. Harper
(74) *Attorney, Agent, or Firm* — Maschoff Brennan

(57) ABSTRACT

A method may include providing access to a first application programming interface (API) provided by a first party and a second API provided by a second party. The method may also include collecting a first set of API data sources related to the first API and a second set of API data sources related to the second API. The method may additionally include using a deep learning model to predict a privacy trustworthiness level for the first API and the second API, and disabling access to the first API based on the privacy trustworthiness level of the first API being below a threshold level.

20 Claims, 8 Drawing Sheets

(56) References Cited

U.S. PATENT DOCUMENTS

| | | |
|---|---|---|
| 9,197,600 B2 | 11/2015 | L'Heureux et al. |
| 9,208,322 B1 | 12/2015 | Ma et al. |
| 9,223,479 B2 | 12/2015 | Deng et al. |
| 9,367,680 B2 | 6/2016 | Mahaffey et al. |
| 9,514,106 B2 | 12/2016 | Yamamoto |
| 9,523,213 B2 | 12/2016 | Pyaga |
| 9,639,243 B2 | 5/2017 | Deng et al. |
| 9,679,144 B2 | 6/2017 | Molner et al. |
| 9,940,479 B2 | 4/2018 | Ionescu et al. |
| 10,007,959 B2 | 6/2018 | Wood |
| 10,140,321 B2 | 11/2018 | Hakkani-Tur et al. |
| 10,152,605 B2 | 12/2018 | Shetye |
| 10,203,990 B2 | 2/2019 | Wagner et al. |
| 2005/0060297 A1* | 3/2005 | Najork ............... G06F 16/951 |
| 2008/0154889 A1* | 6/2008 | Pfeiffer ............. G06F 16/738 |
| | | 707/999.005 |
| 2009/0249451 A1* | 10/2009 | Su ..................... G06F 21/6218 |
| | | 726/5 |
| 2009/0254572 A1* | 10/2009 | Redlich ............... G06Q 10/107 |
| 2014/0019457 A1* | 1/2014 | Xie ..................... G06F 16/95 |
| | | 707/741 |
| 2014/0280952 A1* | 9/2014 | Shear ................... H04L 63/10 |
| | | 709/226 |
| 2014/0282586 A1* | 9/2014 | Shear ............... G06F 16/24575 |
| | | 718/104 |
| 2015/0143459 A1* | 5/2015 | Molnar ............... G06T 19/006 |
| | | 726/2 |
| 2016/0034305 A1* | 2/2016 | Shear ................... H04L 47/70 |
| | | 707/722 |
| 2016/0080485 A1* | 3/2016 | Hamedi ............... G06Q 50/01 |
| | | 709/204 |
| 2019/0303623 A1* | 10/2019 | Reddy ................. H04L 9/3239 |
| 2020/0117690 A1* | 4/2020 | Tran ............... G06F 16/90332 |
| 2020/0125682 A1* | 4/2020 | Bahrami ............. G06F 16/951 |

* cited by examiner

PRIVACY TRUSTWORTHINESS BASED API ACCESS

FIELD

Embodiments of the present disclosure relate to application programming interface (API) access based on privacy trustworthiness.

BACKGROUND

Different software vendors, APIs, etc. may be more or less trustworthy with regard to how they handle and utilize personal information and handle other privacy issues. However, there are limited ways to track, monitor, or represent the trustworthiness of an API.

SUMMARY

One or more embodiments of the present disclosure may include a method that includes providing access to a first application programming interface (API) provided by a first party and a second API provided by a second party. The method may also include collecting a first set of API data sources related to the first API and a second set of API data sources related to the second API. The method may additionally include using a deep learning model to predict a privacy trustworthiness level for the first API and the second API, and disabling access to the first API based on the privacy trustworthiness level of the first API being below a threshold level.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

The present disclosure relates to the use of a deep learning model by an API developer to manage and predict privacy trustworthiness levels for the APIs provided by the API developer. For example, the developer may utilize a web crawler to obtain various types of data related to the API indicative of the privacy trustworthiness of the API, the API host, and/or a platform using the API. Such data may be stored in an API data corpus with different versions corresponding to the different points in time that the data is collected. The deep learning model may utilize training sets of API data corpuses to train the deep learning model such that the deep learning model may be applied to newly acquired API data corpuses, whether for new APIs or new data corpuses for previously analyzed APIs. In some embodiments, the developer may allow access or disallow access to certain APIs based on the privacy trustworthiness level of the APIs.

Certain embodiments of the present disclosure may provide improvements over previous iterations of API management that improve the technology and the manner in which a computer operates. For example, by utilizing a deep learning model, new types of connections, patterns, etc. based on privacy trustworthiness that may not be discernable by humans may be obtained. In some circumstances, the data collected does not require a login such that the privacy trustworthiness may be determined prior to sending any sensitive information. Additionally, the present disclosure may provide increased security for API developers because certain APIs may be disabled by the developer such that end users utilizing the developer to access APIs may be protected from APIs with insufficient care for privacy trustworthiness.

One or more example embodiments are explained with reference to the accompanying drawings.

Figure 1:
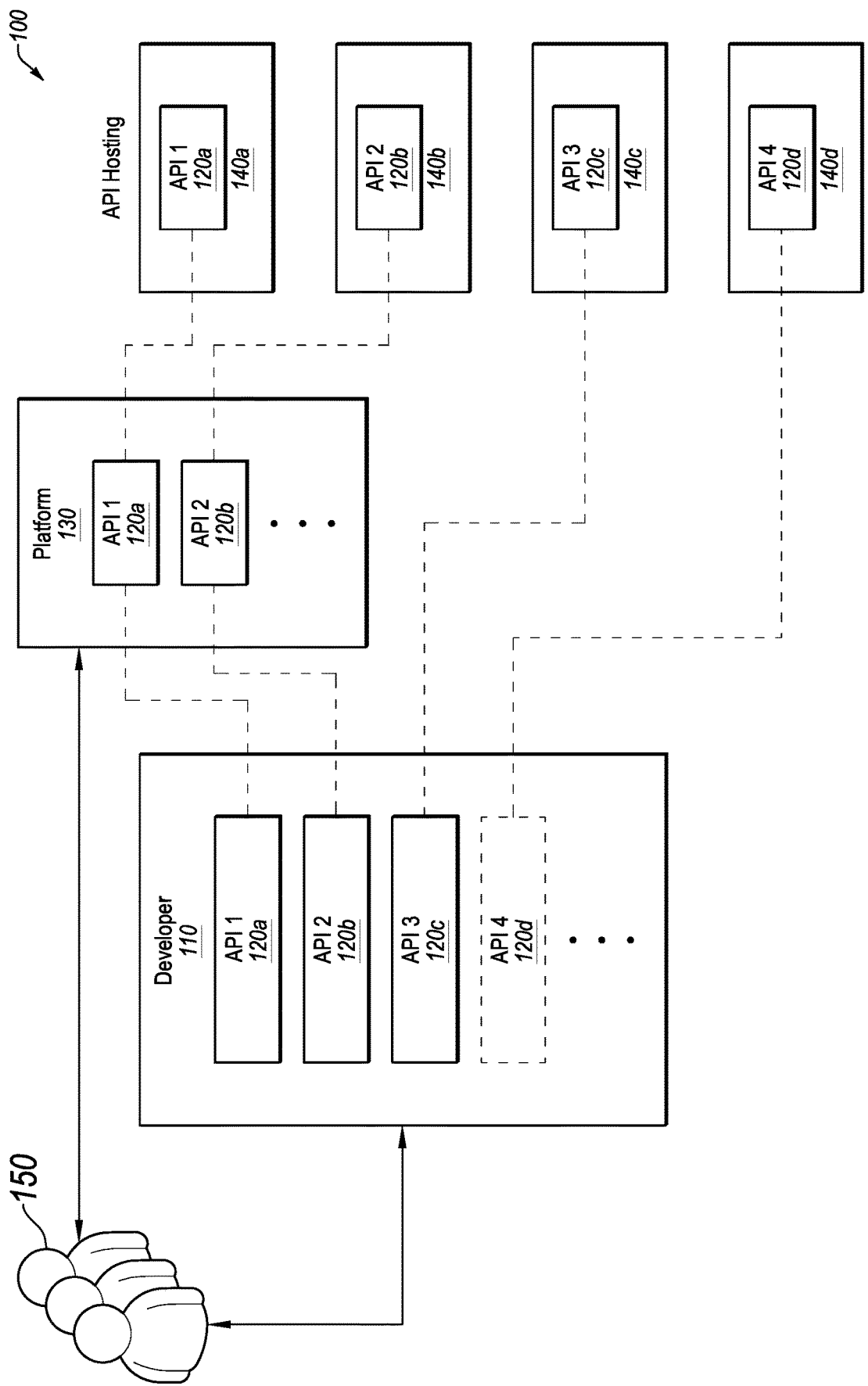
FIG. 1 is a diagram illustrating an example system that may be used for privacy trustworthiness based API access.

FIG. 1 is a diagram illustrating an example system 100 that may be used for privacy trustworthiness based API access, in accordance with one or more embodiments of the present disclosure. A developer 110 may provide a computing system that permits end users 150 to access various APIs 120 (such as API 1 120*a*, API 2 120*b*, API 3 120*c*, and/or API 4 120*d*) through a single repository. Some of the APIs 120 may be used on various platforms 130 (such as the API 1 120*a* and the API 2 120*b*). The various APIs 120 may be hosted and/or otherwise provided by various API hosts 140, such as the API host 140*a* hosting API 1 120*a*, the API host 140*b* hosting API 2 120*b*, the API host 140*c* hosting API 3 120*c*, and/or the API host 140*d* hosting API 4 120*d*. The end users 150 may access the APIs 120 via the developer 110 and/or via one or more platforms 130, or even from the API hosts 140 directly. The developer 110 may determine a privacy trustworthiness score and/or level for each of the APIs 120, and may grant or revoke access to the APIs 120 based on the privacy trustworthiness score and/or level. In these and other embodiments, the developer 110 may utilize a deep learning model to facilitate the determination of the privacy trustworthiness scores and/or levels.

In some embodiments, the developer 110 may collect a variety of information for each of the APIs 120 to facilitate determination of the privacy trustworthy level for each of the APIs 120. For example, the developer 110 may crawl webpages related to a given API 120 to collect terms of service and/or terms of use of the given API 120, terms of service terms and/or terms of use of a platform 130 in which the given API 120 is used and/or a host 140 of the given API 120, documentation describing the given API 120, examples of using the given API 120, news stories related to the given API 120, news stories regarding the platform 130 and/or the host 140 of the given API 120, a stock price of the platform 130 and/or the host 140 of the given API 120, etc. All the documentation data may be collected and stored in a particular version of an API data corpus related to the given API 120. The various data sources may be tracked over time and stored as different versions such that the changes over time may be tracked. An example of collecting data regarding the APIs 120 and storing them in data corpuses may be described with reference to FIGS. 2 and 5.

In some embodiments, the data collected regarding the various APIs 120 may be processed to be used in a deep learning model. For example, the frequency of terms related to privacy or data usage may be analyzed and quantified, the rise or fall of stock prices may be quantified, the amount of data shared and with which entities the data is shared may be analyzed. An example of data processing of the data corpuses of the APIs 120 to be used by the deep learning model may be described with reference to FIG. 6.

Using the collected data, the developer 110 may train a deep learning model of privacy trustworthiness levels for the APIs 120. For example, the deep learning model may analyze historical data corpuses of multiple APIs 120 to stratify the different versions of the data corpuses of the APIs 120 into different levels of privacy trustworthiness. The deep learning model may use such learned levels of privacy trustworthiness to predict privacy trustworthiness for unknown APIs 120 and/or future versions of the data corpuses for the APIs 120. An example of training the deep learning model may be described in greater detail with reference to FIGS. 3 and 7.

In some embodiments, the developer 110 may utilize the privacy trustworthiness levels of the APIs 120 to determine whether or not access is granted to the various APIs 120. For example, the privacy trustworthiness levels may be divided into four levels and APIs 120 with a privacy trustworthiness level of the upper two levels may be deemed to operate at a privacy trustworthiness level secure enough to permit access, while the lower two levels may be below a threshold level and such APIs 120 may be disabled such that those APIs 120 may not be invoked via the system of the developer 110. As illustrated in FIG. 1, API 1 120a, API 2 120b, and API 3 120c are all above the threshold (e.g., in a privacy trustworthiness level that is deemed acceptable) such that those APIs 120 are acceptable and accessible to the end users 150. As illustrated by the dashed out lines, the API 4 120d may be below the threshold level and so may be inaccessible via the system of the developer 110.

In some embodiments, the developer 110 may monitor the privacy trustworthiness levels of the APIs 120 over time. For example, based on changes to the data monitored by the developer 110, the privacy trustworthiness level of one or more of the APIs 120 may move between levels. For example, the API 3 120c may drop below the threshold level and may be disabled at a later point in time, and at another point in time the API 4 120d may rise above the threshold level and may be enabled such that end users 150 may access the API 4 120d via the system of the developer 110.

Modifications, additions, or omissions may be made to the system 100 without departing from the scope of the disclosure. For example, the system 100 may include any number of other elements or may be implemented within other systems or contexts than those described. For example, the system 100 may include any number of APIs 120 (such as tens of thousands of APIs). As another example, any number of platforms 130 and/or API hosts 140 may utilize and/or host any number of APIs 120.

Figure 2:
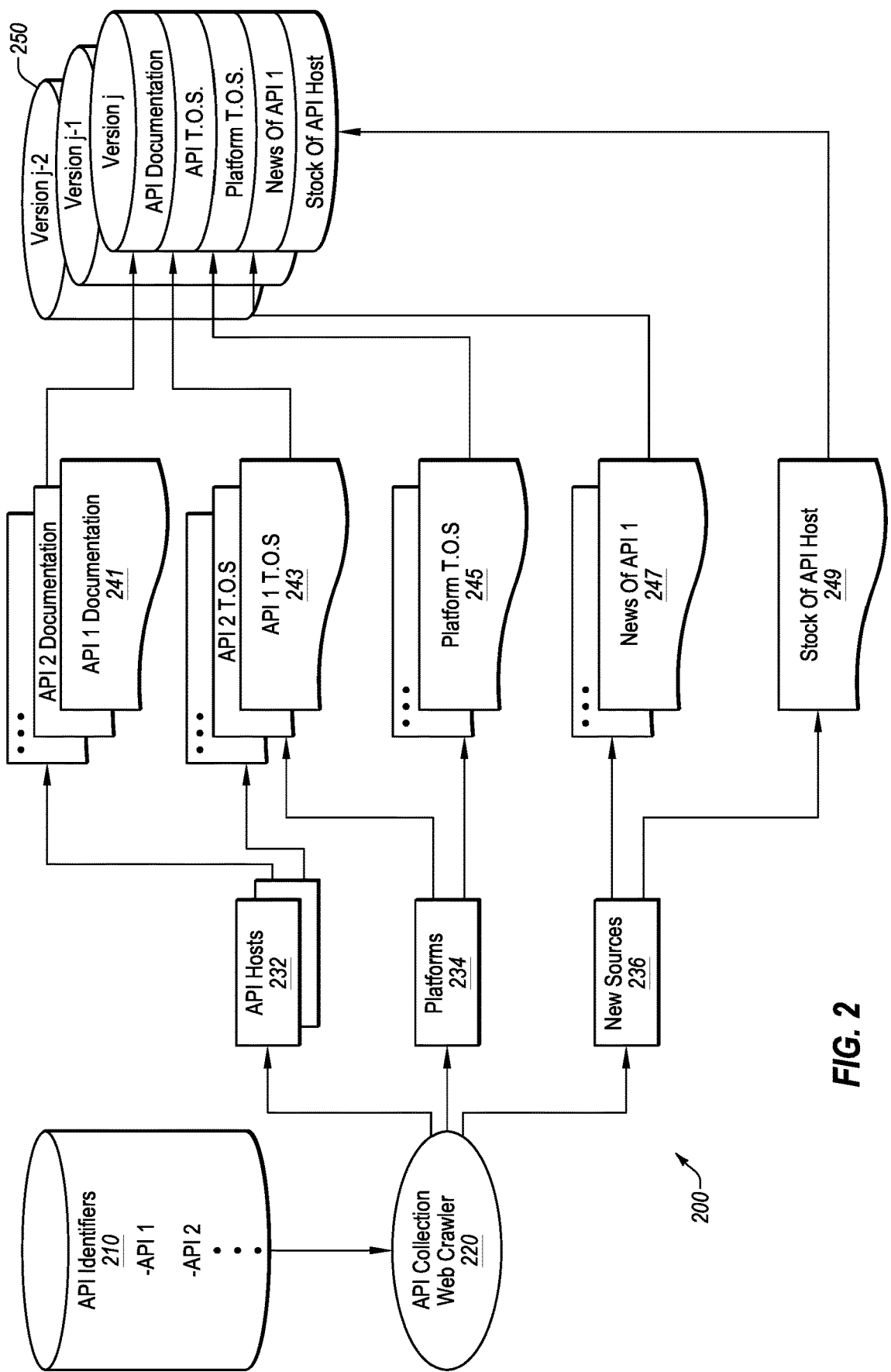
FIG. 2 illustrates an example system associated with data collection associated with privacy trustworthiness based API access.

FIG. 2 illustrates an example system 200 associated with data collection associated with privacy trustworthiness based API access, in accordance with one or more embodiments of the present disclosure. The system 200 may include a repository 210 of API identifiers that may be accessed by an API collection web crawler 220 to gather information regarding the API identified in the repository 210. For example, the web crawler 220 may crawl web sites from API hosts 232 that may host or otherwise provide APIs, from platforms 234 that may utilize APIs, and/or from news sources 236. The web crawler 220 may gather information such as API documentation 241, API terms of service (TOS) 243, a platform TOS 245, news related to the API 247, and/or stock of an API host 249. The gathered information may be stored in an API data corpus 250.

The repository 210 of API identifiers may include any storage media, database, etc. of a developer (such as the developer 110 of FIG. 1). For example, the repository 210 may include a storage media storing a name or title of an API, a uniform resource locator (URL) of a homepage or other site associated with the API, etc. via which the web crawler 220 may locate documentation related to the API. In some embodiments, the repository 210 may store the name or title of an API, and the developer may automatically search for the URL associated with the API.

Based on the identifier of the API (e.g., the name, title and/or URL of the API), the web crawler 220 may collect various API documentations 241 related to the API from a variety of sources. For example, the web crawler 220, beginning at the URL in the repository 210, may gather all documents and web pages for the API such as all hypertext markup language (HTML) pages linked from the URL in the repository 210, all text, portable document format (PDF), compressed files (e.g., ZIP files), DOC/DOCX files, etc. In some embodiments, the web crawler 220 may store all the API documentations 241 in the data corpus 250.

In some embodiments, the web crawler 220 may collect the API TOS 243 for a specific API. For example, the web crawler 220 may identify links from the URL in the repository that mention terms of use, terms of service, end-user license, end-user agreement, etc. and may gather all related documents and/or web pages. Additionally or alternatively, the web crawler 220 may crawl web pages associated with the platforms 234 that may utilize the associated API. For example, if a social media platform utilized a third party API, the social media platform may include one or more web pages that includes the API TOS 243. In these and other embodiments, the web crawler 220 may store all the API TOS 243 in the data corpus 250.

In some embodiments, the web crawler 220 may collect the platform TOS 245 for the platforms 234 that utilize or offer the specific API. For example, the web crawler 220 may navigate to the page for such a given platform 234 and may gather all of the pages and/or documents in the About, Help, Customer Service, Terms of Service, Terms of Use, etc. In these and other embodiments, by gathering such documents and pages, the web crawler 220 may collect the platform TOS 245 specific to the given platform 234, rather than specific to the API. In this manner, the potential privacy considerations associated with the platform 234 generally, as reflected in the TOS for the platform 234, may be included in the data corpus 250 in addition to the data related to the API specifically.

In some embodiments, the web crawler 220 may collect news of the API 247, the platform 234, and/or the API host 232 for a given API. For example, the web crawler 220 may crawl various news websites or news feeds for content including the title of the given API, the platform 234, and/or the API host 232. Additionally or alternatively, the web crawler 220 may collect stock information of the API host 249 and/or stock information of the platform. In these and other embodiments, the collected news of the API 247 and/or related entities, and stock of the API host 249 and/or related entities may be stored in the API data corpus 250. In some embodiments, the web crawler 220 may access a known stock exchange website, database, repository, etc. on a regular basis and store the current stock price for one or more of the API host 232 and/or the platform 234.

In some embodiments, the web crawler 220 and/or the developer utilizing the web crawler 220 may sort through the collected documents and/or web pages to discard unnecessary or duplicative pages. For example, if the platform 234 has multiple places where the same TOS are stored, the developer may store one and discard the rest. As another example, the web crawler 220 and/or the developer may utilize a text string search feature within the web pages or documents for terms related to privacy, and may discard the remaining pages and/or documents. As an additional example, the web crawler 220 and/or the developer may search the collected news stories for terms related to stock prices and changes thereof, and may store those pages and documents together as indicative of the stock price.

In some embodiments, the developer may store the collected documents as one version j of the API data corpus 250. The version j may represent the API data corpus 250 at a given point in time. As time progresses, the developer may store additional versions of the API data corpus 250 such that the developer may store a version j, version j-1, version j-2, . . . , such that historical changes and/or differences in the API data corpus 250 may be observable and/or tracked. In some embodiments, the new versions of the API data corpus 250 may include indications of what has changed without storing all of the documents. For example, the version j of the API data corpus 250 may include indications of the changes from version j-1 to version j in various documents or webpages without storing the entire documents. In this manner, the version j may be recreated if requested based on the version j-1 and the indications of change.

In some embodiments, the web crawler 220 may be configured to access publicly available websites without providing login information or other credentials. By avoiding the provision of such credentials, the web crawler 220 may gather the relevant information to determine whether or not a given API has a sufficient level of trustworthiness prior to providing any personal information, including credentials for logging in.

Modifications, additions, or omissions may be made to the system 200 without departing from the scope of the disclosure. For example, the system 200 may include any number of other elements or may be implemented within other systems or contexts than those described. For example, the system 200 may include any number of APIs identified in the API identifiers 210 (such as tens of thousands of APIs). As another example, any number of platforms 234 and/or API hosts 232 may utilize and/or host any number of the APIs. As an additional example, the various data forms related to the APIs may be stored in any arrangement or combination, and the API data corpus 250 merely serves as one example configuration.

Figure 3:
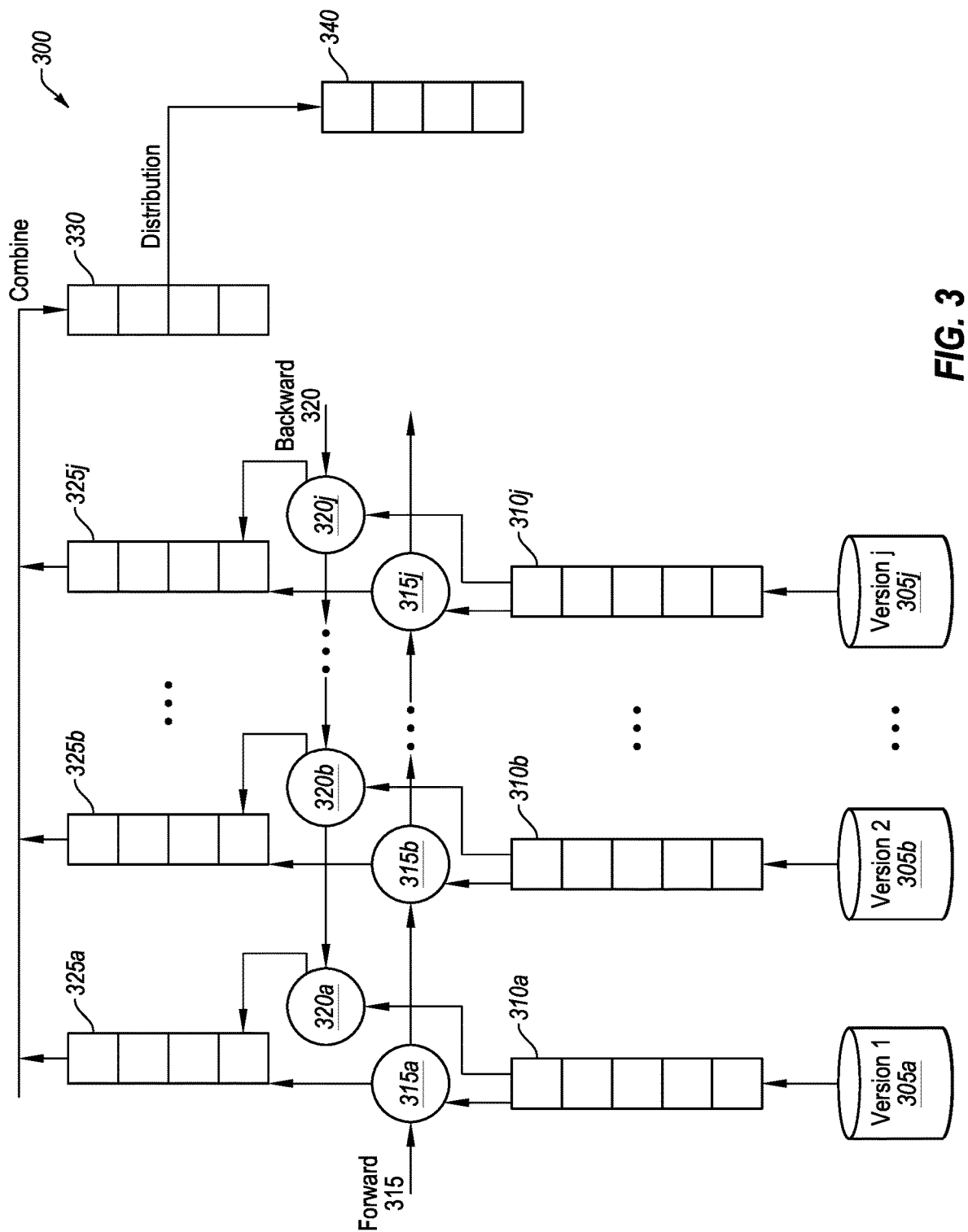
FIG. 3 illustrates an example data flow associated with privacy trustworthiness based API access.

FIG. 3 illustrates an example data flow 300 associated with privacy trustworthiness based API access, in accordance with one or more embodiments of the present disclosure. The data flow 300 illustrates that data processing is performed on different versions of the API data corpuses 305 (such as the data corpuses of Version 1 305a, Version 2 305b, and Version j, 305j) to derive inputs 310 (such as the inputs 310a, 310b, and 310j) for the deep learning model. As illustrated in FIG. 3, the deep learning model is a bidirectional long short-term memory (bi-LSTM) deep learning model, with forward analysis 315 (such as is performed at the forward analysis nodes 315a, 315b, and 315j) and backward analysis 320 (such as performed at the backward analysis nodes 320a, 320b, and 320j) to yield a privacy trustworthiness score 325 (such as the trustworthiness scores 325a, 325b, and 325j). The privacy trustworthiness scores 325 may be combined into a combined scores set 330. The combined scores set 330 may be distributed into a distribution of privacy trustworthiness levels 340. In some embodiments, the data flow 300 may illustrate an example of training the deep learning model.

The data processing to convert the API data corpuses 305 into inputs 310 for the deep learning model may include any of a variety of data processing techniques, data extraction, etc. For example, certain aspects of the API data corpuses 305 may be analyzed to determine the frequency of occurrence of certain terms related to privacy. As another example, certain rules may be applied to the data to provide an indication of the effect of the data on a privacy trustworthiness score (e.g., a decrease in stock price results in a decrease in the privacy trustworthiness score). As an additional example, various aspects of the data may be represented numerically (e.g., based on rules indicating how the various aspects of the data are converted to numerical values and how those values impact the privacy trustworthiness score). An example of data processing of the data corpuses of the APIs 305 to be used by the deep learning model may be described with reference to FIG. 6.

The inputs 310 may be fed to both the forward analysis nodes 315 and the backward analysis nodes 320 such that the deep learning model uses data in the future and data in the past to determine how a given API data corpus is to be scored by the deep learning model, which aims to find a template between data in the past and predicts the future data accordingly. Additionally or alternatively, the deep learning model may utilize the inputs 310 to find correlations, patterns, etc. among the data such that the deep learning model may correlate data from the API data corpuses 305 into the privacy trustworthiness scores and/or levels.

The privacy trustworthiness scores 325 may represent the output of the layers of the deep learning model. The privacy trustworthiness scores 325 may represent numerical values indicative of a relative rank of privacy trustworthiness. The combined scores set 330 may represent a combination of the privacy trustworthiness scores 325 from each of the versions of the API data corpuses 305 used by the deep learning model. For example, the privacy trustworthiness scores 325 may be concatenated together such that a series of values may be gathered into a single data structure.

The privacy trustworthiness levels 340 may represent a distribution of the combined scores set 330. For example, the values from the combination of privacy trustworthy scores may be distributed across a selected number of privacy trustworthiness levels 340 such that thresholds between the levels may be established. By utilizing a larger number of levels, a greater differentiation may be achieved with respect to privacy trustworthiness at the expense of the accuracy of the deep learning model. For example, if the number of levels were two such that the privacy trustworthiness levels were essentially "trusted" or "not trusted," the deep learning model may have a high level of accuracy in predicting privacy trustworthiness level for a given API. If the number of levels were eight such that the privacy trustworthiness levels provided more of a gradient, the deep learning model would not be as accurate in identifying which of the eight precise levels to which a particular API belongs.

Modifications, additions, or omissions may be made to the data flow 300 without departing from the scope of the disclosure. For example, while a bi-LSTM deep learning model is depicted, other deep learning models may also be used. As another example, any number of versions across any number of APIs may be used to derive the privacy trustworthiness levels.

Figure 4:
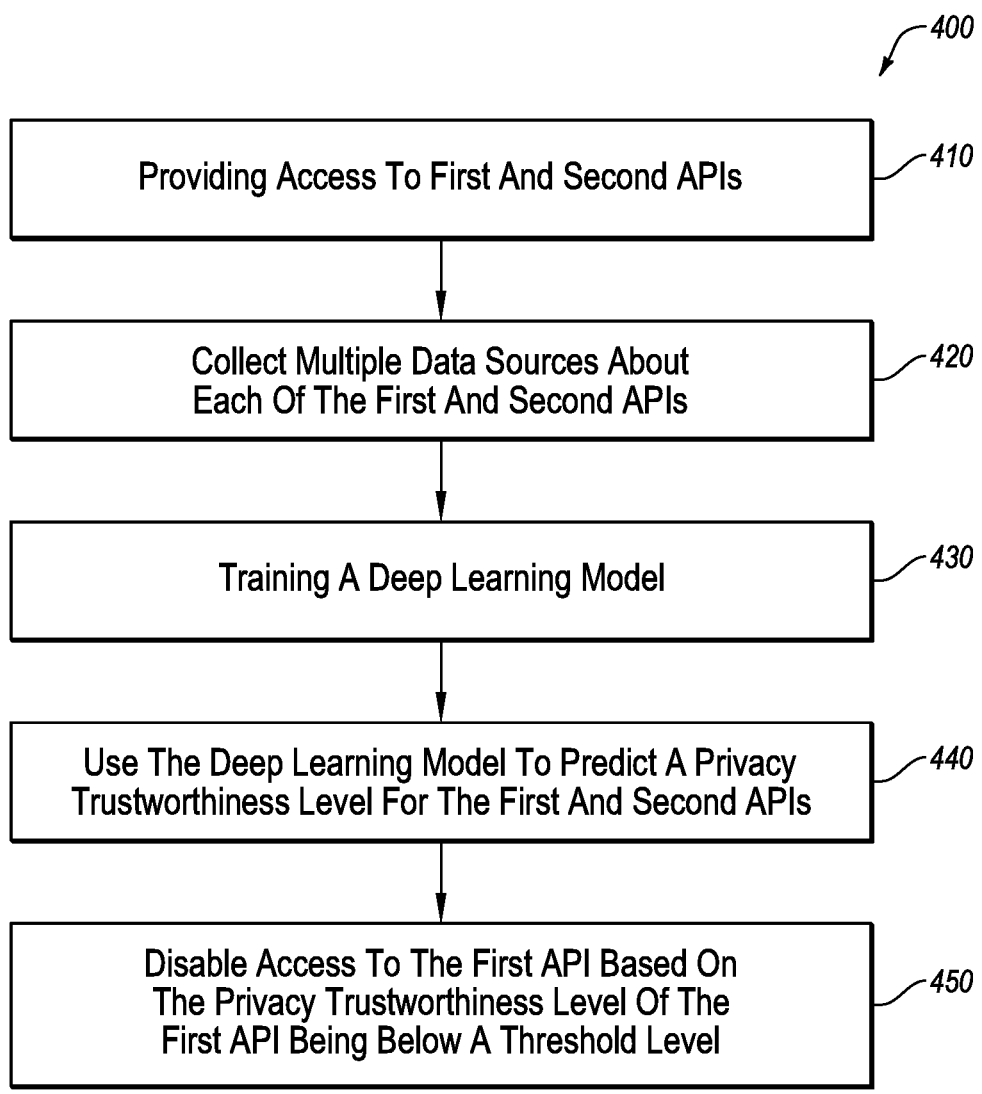
FIG. 4 illustrates an example flowchart of an example method associated with privacy trustworthiness based API access.

FIG. 4 illustrates an example flowchart of an example method 400 associated with privacy trustworthiness based API access, in accordance with one or more embodiments of the present disclosure. One or more operations of the method 400 may be performed by a system or device, or combinations thereof, such as the system 100, the developer 110 of FIG. 1, and/or the system 200 of FIG. 2. Although illustrated as discrete blocks, various blocks of the method 400 may be divided into additional blocks, combined into fewer blocks, or eliminated, depending on the desired implementation.

At block 410, access may be provided to a first API and a second API. For example, a developer (such as the developer 110 of FIG. 1) may provide access to multiple APIs, including a first API and a second API. The provider may compile the APIs and permit end users to access the APIs via the system of the provider.

At block 420, multiple data sources about each of the first and second APIs may be collected. For example, a web crawler of the developer may gather documents and web pages from multiple sources that are related to each of the APIs. The data collected may be stored in an API data corpus for the specific API. Additionally or alternatively, at another point in time, another set of data may be collected and stored as a distinct version of the API data corpus for the specific API.

At block 430, a deep learning model may be trained. For example, the developer may utilize the collected data to train a deep learning model that may permit the prediction of a privacy trustworthiness level of an API based on the collected data.

At block 440, the deep learning model may be used to predict a privacy trustworthiness level for the first and the second APIs. For example, based on the training of the deep learning model, the collected data for the first and the second API in a most recent version of the API data corpuses may be provided to the deep learning model, and the deep learning model may output a predicted privacy trustworthiness level based on the gathered data.

At block 450, access to the first API may be disabled by the developer based on the privacy trustworthiness level of the first API being below a threshold level. For example, the provider may monitor the privacy trustworthiness levels of the API as predicted by the deep learning model, and based on the privacy trustworthiness level of the first API changing to be below the threshold, the developer may disable access to the first API such that end users may not be able to invoke the first API via the system of the developer.

Modifications, additions, or omissions may be made to the method 400 without departing from the scope of the disclosure. For example, the operations of the method 400 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 5:
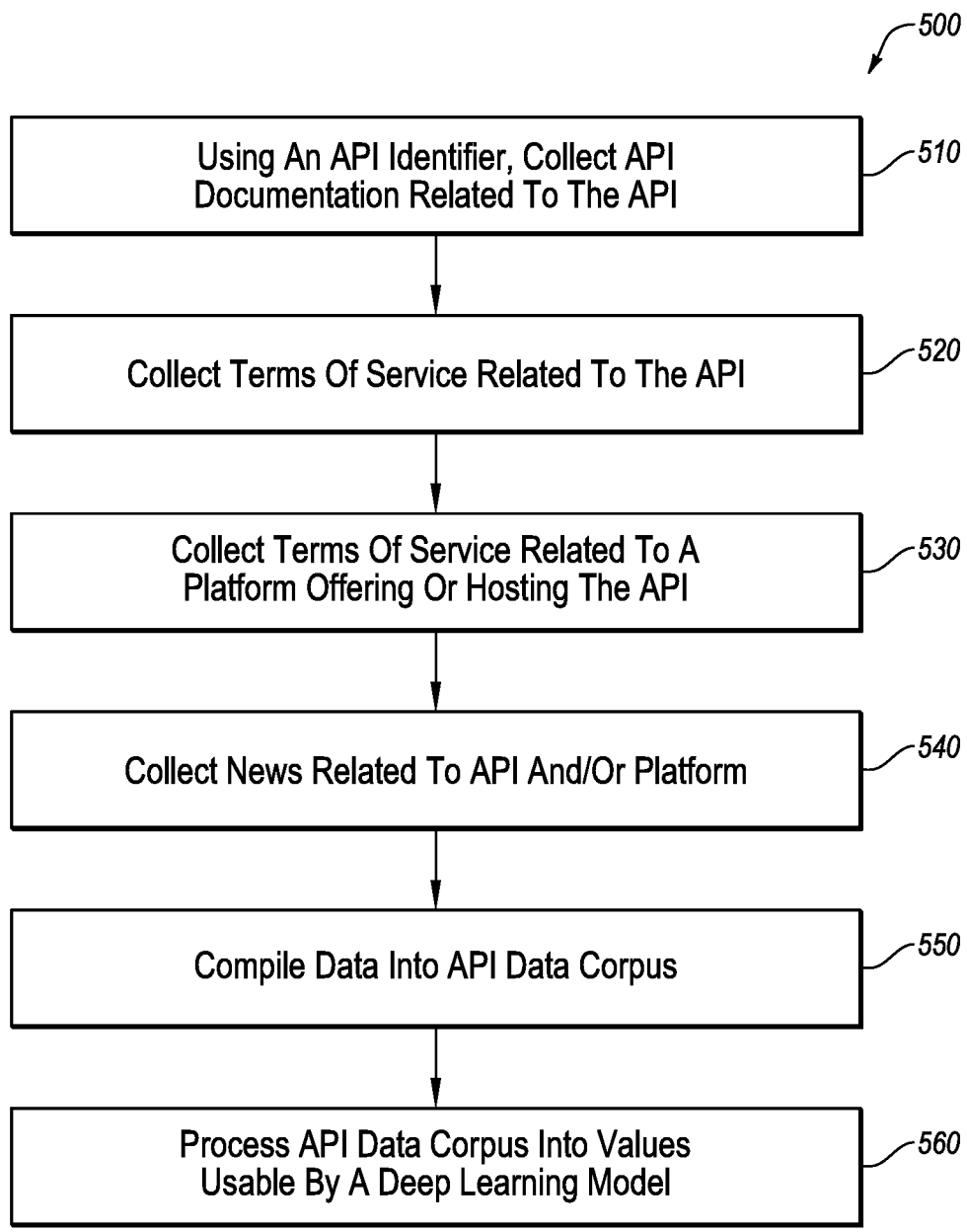
FIG. 5 illustrates an example flowchart of an example method associated with data collection and/or processing for privacy trustworthiness based API access.

FIG. 5 illustrates an example flowchart of an example method 500 associated with data collection and/or processing for privacy trustworthiness based API access, in accordance with one or more embodiments of the present disclosure. One or more operations of the method 500 may be performed by a system or device, or combinations thereof, such as the system 100, the developer 110 of FIG. 1, and/or the system 200 of FIG. 2. Although illustrated as discrete blocks, various blocks of the method 500 may be divided into additional blocks, combined into fewer blocks, or eliminated, depending on the desired implementation.

At block 510, using an API identifier, API documentation related to the API may be collected. For example, a web crawler (such as the web crawler 220 of FIG. 2) of a developer (such as the developer 110 of FIG. 1) may be configured to crawl a URL identifying an API and collect all web pages and documents related to the API.

At block 520, the terms of service (TOS) related to the API may be collected. For example, the web crawler may crawl pages related to the API and or hosted by an entity hosting the API to identify the TOS of the API. In some embodiments, the block 520 may include analyzing certain pages and/or documents collected at the block 510 and identifying them as the TOS of the API. For example, certain terms, titles, headers, etc. may be used to identify the TOS of the API.

At block 530, the TOS related to a platform offering or hosting the API may be collected. For example, the web crawler may crawl the web pages of a platform offering or hosting the API. In these and other embodiments, the API identifier may include a URL of the platform offering or hosting the API to provide a starting location for the web crawler. In some embodiments, the block 520 may include analyzing certain pages and/or documents and identifying them as the TOS of the platform. For example, certain terms, titles, headers, etc. may be used to identify the TOS of the platform.

At block 540, news related to the API and/or the platform may be collected. For example, the web crawler may traverse various news streams, news databases, news sites, or other news sources to collect news stories that mention any of the API, a host or developer of the API, a platform that offers or hosts the API, etc. In some embodiments, such news stories may include stories related to stock prices for the host of the API and/or the platform offering or hosting the API. Additionally or alternatively, stock tickers or other stock price sources may be traversed by the web crawler to collect stock prices of the host of the API and/or the platform offering or hosting the API.

At block 550, the data collected at any of the blocks 510, 520, 530, and/or 540 may be compiled into an API data corpus. For example, the developer may store the collected data in a version of the API data corpus associated with the date and/or time when the data was collected. In some embodiments, the collection of data may be triggered periodically (e.g., once a week, once a month, etc.). Additionally or alternatively, a triggering event may cause the collection of a new version of the API data corpus (e.g., the stock price drops a certain amount, a new version number of the API is released, etc.).

At block 560, the API data corpus may be processed into values usable by a deep learning model. In some embodiments, different data processing may be performed on different data values. An example of the data processing is described in greater detail with reference to portions of FIG. 6.

Modifications, additions, or omissions may be made to the method 500 without departing from the scope of the disclosure. For example, the operations of the method 500 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 6:
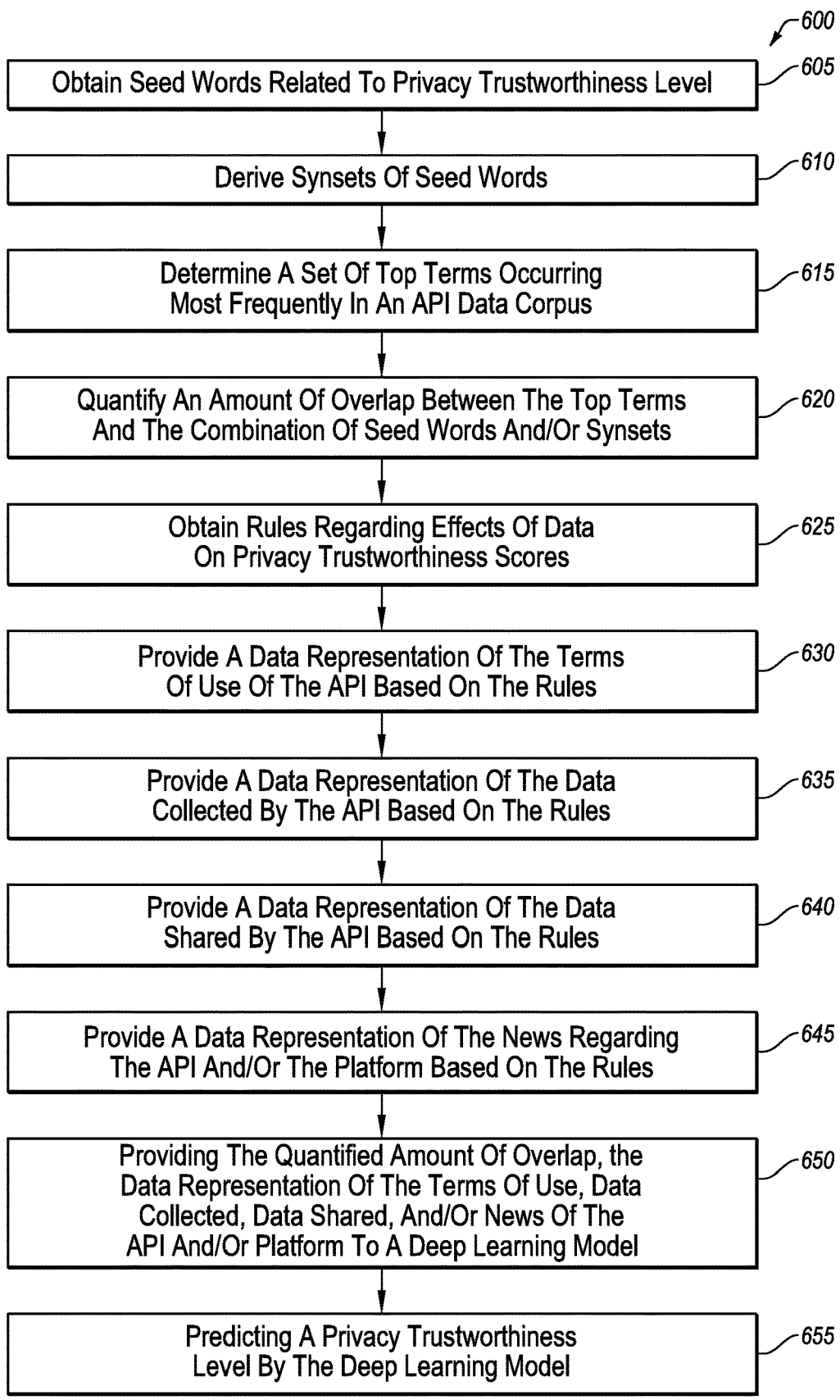
FIG. 6 illustrates another example flowchart of another example method associated with data collection and/or processing for privacy trustworthiness based API access.

FIG. 6 illustrates another example flowchart of another example method 600 associated with data collection and/or processing for privacy trustworthiness based API access, in accordance with one or more embodiments of the present disclosure. One or more operations of the method 600 may be performed by a system or device, or combinations thereof, such as the system 100, the developer 110 of FIG. 1, and/or the system 200 of FIG. 2. Although illustrated as discrete blocks, various blocks of the method 600 may be divided into additional blocks, combined into fewer blocks, or eliminated, depending on the desired implementation.

At block 605, seed words related to a privacy trustworthiness level may be obtained. For example, an administrator or other human operator may interact with a system of a developer (such as the developer 110 of FIG. 1) to provide such seed words. Examples of such seed words may include privacy, data protection, security, etc.

At block 610, a synset of the seed words may be derived. For example, any words related to, synonymous with, or otherwise linked to the seed words may be part of the synset for the given seed word. In some embodiments, the seed words may be provided to WordNet® or other similar tool to derive the words linked to the seed words.

At block 615, a set of top terms occurring most frequently in an API data corpus may be determined. For example, a word count may be performed individually for each document or web page in the API data corpus. Across all of the documents or web pages, the top A values may be stored in a data structure, with A being an integer value indicative of how many of the top terms are to be stored. Additionally or alternatively, the top A terms from each of the documents individually may be stored, and a set of top terms for the entire API data corpus may be determined from the set of individual document top A terms.

At block 620, an amount of overlap between the top A terms and the combination of seed words and/or synsets thereof may be quantified. For example, a comparison may be made between the top A terms and the seed words or the seed words and the synsets of the seed words, and that amount of overlap and/or the quantity of use of the terms that overlap may be quantified. In some embodiments, rather than quantifying the amount of overlap, a set of words that overlaps between the API data corpus and the seed words and/or the synsets thereof may be constructed. In these and other embodiments, the set of words that represents the overlap may vary based on the version of the data corpus and/or the API. For example, a first API may use certain terms to describe privacy considerations while a second API may use a different term and as such, the set of overlapping words may be different for the first API and the second API.

At block 625, rules may be obtained regarding the effects of data on a privacy trustworthiness score. Such rules may relate to any of the data contained within the API data corpus and/or data derived therefrom. For example, an increase in stock price may indicate an increase in privacy trustworthiness, a negative news story may indicate a decrease in privacy trustworthiness, infrequent use of privacy related terms may indicate a decrease in privacy trustworthiness, etc. The rules may also relate to terms or sections in the TOS of the API, a platform using the API, and/or a host of the API.

At block 630, a data representation of the terms of service of the API may be generated based on the rules. For example, the terms of service for a given API may be represented as a vector with different sections of the vector corresponding to different facets of the terms of service. In some embodiments, the deep learning model may facilitate the division of the terms of service of the API into sections to facilitate a section by section comparison between APIs, such that the same vector portion of one API may be compared with the corresponding vector portion of another API to compare the relative privacy trustworthiness.

At block 635, a data representation of the data collected by the API may be provided based on the rules. For example, each element of personal data that is collected by the API may be represented by $D_{\tau,j} \rightarrow API_{\sigma,j}$ where $D_{\tau,j}$ represents the $\tau^{th}$ piece of data collected from the $j^{th}$ version of the data corpus for the API, and $API_{\sigma,j}$ represents the $j^{th}$ version of the API data corpus of the $\sigma^{th}$ API host. For example, if date of birth is $D_{3,2}$ in $API_{1,2}$ the date of birth would be the third piece of data collected in version 2 of the API data corpus for the first API provider. Such a data representation of the elements of collected personal data may be used by the deep learning model. Additionally or alternatively, the rules may provide direction as to how certain types of data affect the privacy trustworthiness score, for example, if a first version of a data corpus for an API collected date of birth and mother's maiden name and a second version of the data corpus for the API collected only the date of birth, the rule(s) may indicate that the first version would have a more negative impact on privacy trustworthiness.

At block 640, a data representation of the data shared by the API may be provided based on the rules. For example, each element of the personal data collected in the block 635 that is shared may be represented by $\delta_{\theta,\sigma,j} \rightarrow Entity_{e,j}$ where $\delta_\theta$ may represent the shared data of the $\sigma^{th}$ API host and the $j^{th}$ version of the API data corpus that is shared with the $Entity_e$. In some embodiments, the entity may include a service provider, a third-party, a user, an internal entity, etc. Such a data representation of the elements of shared data may be used by the deep learning model. Additionally or alternatively, the rules may provide direction as to how certain types of data is shared affects the privacy trustworthiness score, for example, if a first version of a data corpus for an API shares name and address with a third party, and a second version of the data corpus for the API shared only the address with the third party, the rule(s) may indicate that the first version would have a more negative impact on privacy trustworthiness.

At block 645, a data representation of the news regarding the API and/or the platform may be provided based on the rules. For example, the news stories may be collected and ones related to privacy trustworthiness may be selected (e.g., by conducting a term search for terms related to privacy trustworthiness). The news stories may be determined whether to be favorable to the privacy trustworthiness of the API, the API host, and/or the platform using the API. In some embodiments, a degree of favorableness may be determined (e.g., by textual analysis). Additionally or alternatively, a binary decision may be made (e.g., of the five news stories, one is negative, one is neutral, and three are positive regarding privacy trustworthiness). As another example, the stock prices may be collected for the API host and/or the platform using the API. An increase in stock price may reflect favorably on privacy trustworthiness while a decrease in stock price may reflect negatively on privacy trustworthiness. In some embodiments, the change in stock price may be quantified and the number and effect of news stories may be quantified for the deep learning model.

At block 650, the quantified amount of overlap, the data representation of the terms of use, the data collected, the data shared, and/or the news of the API and/or the platform may be provided to a deep learning model. In some embodiments, the data provided to the deep learning model may be in vector form, numerical form, etc. In these and other embodiments, one or more coefficients may be used by the deep learning model with respect to the various data elements provided to the deep learning model that may be adjusted, tuned, or otherwise optimized or improved by the deep learning model. For example, the coefficient may be adjusted such that changes in stock price may not have as large of an effect on a privacy trustworthiness level as compared to data shared to third parties.

At block 655, a privacy trustworthiness level may be predicted by the deep learning model. For example, using the data provided and an already trained deep learning model, the deep learning model may predict a privacy trustworthiness level for the API associated with the data provided to the deep learning model. As another example, if multiple versions of API data corpuses associated with the API are provided to the deep learning model, the deep learning model may predict a future privacy trustworthiness level based on historical variations in the data provided to the deep learning model.

Modifications, additions, or omissions may be made to the method 600 without departing from the scope of the disclosure. For example, the operations of the method 600 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 7:
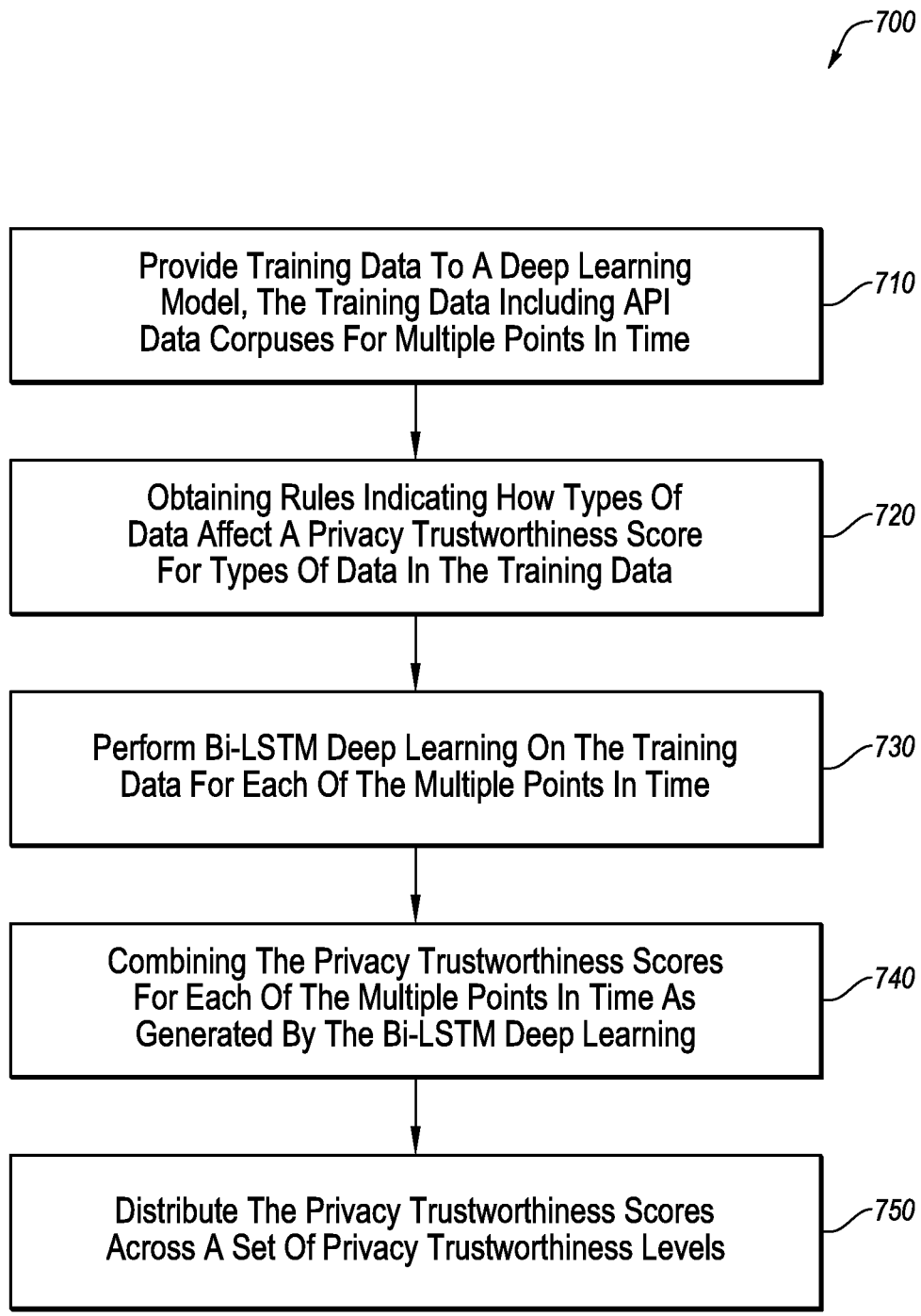
FIG. 7 illustrates an example flowchart of an example method of training a deep learning model associated with privacy trustworthiness based API access.

FIG. 7 illustrates an example flowchart of an example method 700 of training a deep learning model associated with privacy trustworthiness based API access, in accordance with one or more embodiments of the present disclosure. One or more operations of the method 600 may be performed by a system or device, or combinations thereof, such as the system 100, the developer 110 of FIG. 1, and/or the system 200 of FIG. 2. In some embodiments, at least portions of the data flow 300 of FIG. 3 may be representative of the method 700 of FIG. 7. Although illustrated as discrete blocks, various blocks of the method 700 may be divided into additional blocks, combined into fewer blocks, or eliminated, depending on the desired implementation.

At block 710, training data may be provided to a deep learning model, where the training data may include different versions of API data corpuses corresponding to multiple points in time. For example, a developer may receive and provide multiple versions of data corpuses (such as the versions of data corpuses 305 of FIG. 3) to a deep learning model. In some embodiments, data extraction and/or data processing may be performed on the data in the API data corpuses to provide the data in a format as an input (such as the inputs 310) to the deep learning model.

At block 720, rules may be obtained that are indicative of how different types of data affect a privacy trustworthiness score for the types of data in the training data. For example, a rule may indicate that a decrease in stock price may have a negative impact on the privacy trustworthiness score. As another example, a rule may indicate that a privacy trustworthiness score may be positively impacted by a high term count of privacy related terms in the TOS of an API. In some embodiments, the rules may be provided manually by an administrator of the developer. Additionally or alternatively, the deep learning model may infer additional rules and/or adjust existing rules. In some embodiments, the different rules may include coefficients indicative of the impact of a given rule on the overall privacy trustworthiness score and such coefficients may be adjusted by the deep learning model.

At block 730, bi-LSTM deep learning may be performed on the training data for each of the multiple points in time. For example, the training data may be fed to forward analysis nodes (such as the forward analysis nodes 315 of FIG. 3) and backward analysis nodes (such as the backward analysis nodes 320 of FIG. 3) such that the deep learning model may output privacy trustworthiness scores for each of the individual versions of the API data corpuses.

At block 740, the privacy trustworthiness scores may be combined for each of the multiple points in time as generated by the bi-LSTM deep learning model. For example, the various scores may be concatenated into a combined scores set (such as the combined scores set 330). Additionally or alternatively, the various scores may be combined in other manners, such as averaging or other statistical operations.

At block 750, the combined set of privacy trustworthiness scores may be distributed across a set of privacy trustworthiness levels. For example, a softmax operation may be performed on the combined sets of privacy trustworthiness scores across a selected number of privacy trustworthiness levels. In some embodiments, the number of privacy trustworthiness levels may be between two and ten levels. In some embodiments, the variations in API trustworthiness level as changes occur in the API data corpus may provide training data to the deep learning model such that the deep learning model may predict a future privacy trustworthiness level for an API based on previous changes in privacy trustworthiness levels for other similarly situated APIs.

Modifications, additions, or omissions may be made to the method 700 without departing from the scope of the disclosure. For example, the operations of the method 700 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 8:
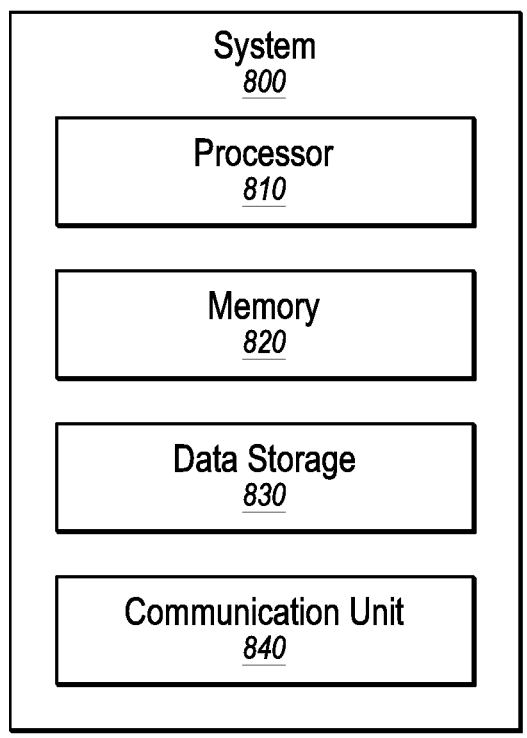
FIG. 8 illustrates an example computing system.

FIG. 8 illustrates an example computing system 800, according to at least one embodiment described in the present disclosure. The computing system 800 may include a processor 810, a memory 820, a data storage 830, and/or a communication unit 840, which all may be communicatively coupled. Any or all of the system 100 of FIG. 1 may be implemented as a computing system consistent with the computing system 800, including the develop 110, the platform 130, the API hosts 140, etc.

Generally, the processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that the processor 810 may include any number of processors distributed across any number of network or physical locations that are configured to perform individually or collectively any number of operations described in the present disclosure. In some embodiments, the processor 810 may interpret and/or execute program instructions and/or process data stored in the memory 820, the data storage 830, or the memory 820 and the data storage 830. In some embodiments, the processor 810 may fetch program instructions from the data storage 830 and load the program instructions into the memory 820.

After the program instructions are loaded into the memory 820, the processor 810 may execute the program instructions, such as instructions to perform any of the methods 400, 500, 600, and/or 700 of FIGS. 4-7, respectively. For example, the processor 810 may obtain instructions regarding collecting data regarding an API, predicting a privacy trustworthiness level of an API, granting or restricting access to an API, etc.

The memory 820 and the data storage 830 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 810. In some embodiments, the computing system 800 may or may not include either of the memory 820 and the data storage 830.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

The communication unit 840 may include any component, device, system, or combination thereof that is configured to transmit or receive information over a network. In some embodiments, the communication unit 840 may communicate with other devices at other locations, the same location, or even other components within the same system. For example, the communication unit 840 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 840 may permit data to be exchanged with a network and/or any other devices or systems described in the present disclosure. For example, the communication unit 840 may allow the system 800 to communicate with other systems, such as computing devices and/or other networks.

One skill in the art, after reviewing this disclosure, may recognize that modifications, additions, or omissions may be made to the system 800 without departing from the scope of the present disclosure. For example, the system 800 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method, comprising:
   providing, by a developer, access to a first application programming interface (API) provided by a first party and a second API provided by a second party;
   collecting a first plurality of API data sources related to the first API and a second plurality of API data sources related to the second API;
   using a deep learning model, predicting a privacy trustworthiness level for the first API and the second API; and
   disabling access to the first API based on the privacy trustworthiness level of the first API being below a threshold level.

2. The method of claim 1, further comprising crawling a plurality of web pages related to the first API to collect the first plurality of API data sources.

3. The method of claim 2, wherein the plurality of web pages include at least one of a documentation page of documents explaining the first API, a page including terms of service of the first API, a page including terms of service of the first party, a news page mentioning the first API or the first party, and a stock web site including a stock price of the first party.

4. The method of claim 3, wherein each of the plurality of web pages are accessed without providing login information related to the respective plurality of web pages.

5. The method of claim 1, further comprising:
   obtaining seed words related to the privacy trustworthiness level;
   based on the seed words, deriving synsets of the seed words;
   determining a set of top terms occurring most frequently in the first plurality of API data sources; and
   quantifying an amount of overlap between the set of top terms and a combination of the seed words and synsets of the seed words;
   wherein the deep learning model uses the amount of overlap in predicting the privacy trustworthiness level for the first API.

6. The method of claim 1, further comprising:
   storing multiple versions of the first plurality of API data sources, each of the multiple versions corresponding to a different point in time;
   tracking changes in the first plurality of API data sources based on differences between the multiple versions; and
   updating the privacy trustworthiness level of the first API based on the tracked changes to the first plurality of API data sources.

7. The method of claim 1, further comprising:
   receiving an identifier of a third API to be provided by the developer upon approval;
   collecting a third plurality of API data sources related to the third API based on the identifier of the third API;
   using the deep learning model, predicting the privacy trustworthiness level for the third API; and
   enabling access to the third API based on the privacy trustworthiness level of the third API being above the threshold level.

8. The method of claim 7, further comprising:
   tracking historic values of the privacy trustworthiness level of the first API;
   wherein the deep learning model uses the historic values of the privacy trustworthiness level of the first API to predict a future privacy trustworthiness level of the first API, the second API, or the third API.

9. The method of claim 1, further comprising training the deep learning model, comprising:
   providing extracted data from the first plurality of API data sources related to the first API for multiple points in time as training data;
   obtaining rules related to types of data of the extracted data, the rules indicating how the types of data affect a privacy trustworthiness score;
   performing bidirectional long short-term memory (bi-LSTM) deep learning on the extracted data for each of the multiple points in time to derive a first API privacy trustworthiness score for each of the multiple points in time;
   combining the first API privacy trustworthiness scores for each of the multiple points in time; and
   distributing the privacy trustworthiness scores across a plurality of privacy trustworthiness levels as representative privacy trustworthiness levels.

10. The method of claim 1, further comprising:
deriving data collected by the first API; and
deriving data shared by the first API and to what entity the data shared is provided;
wherein the deep learning model uses the data collected by the first API, the data shared by the first API, and the entity to which the data shared is provided by the first API in predicting the privacy trustworthiness level of the first API.

11. A non-transitory computer-readable medium containing instructions that, when executed by one or more processors, are configured to perform operations, the operations comprising:
providing access to a first application programming interface (API) provided by a first party and a second API provided by a second party;
collecting a first plurality of API data sources related to the first API and a second plurality of API data sources related to the second API;
using a deep learning model, predicting a privacy trustworthiness level for the first API and the second API; and
disabling access to the first API based on the privacy trustworthiness level of the first API being below a threshold level.

12. The computer-readable medium of claim 11, the operations further comprising:
crawling a plurality of web pages related to the first API to collect the first plurality of API data sources;
wherein the plurality of web pages include at least one of a documentation page of documents explaining the first API, a page including terms of service of the first API, a page including terms of service of the first party, a news page mentioning the first API or the first party, and a stock web site including a stock price of the first party.

13. The computer-readable medium of claim 12, wherein each of the plurality of web pages are accessed without providing login information related to the respective plurality of web pages.

14. The computer-readable medium of claim 11, the operations further comprising:
obtaining seed words related to the privacy trustworthiness level;
based on the seed words, deriving synsets of the seed words;
determining a set of top terms occurring most frequently in the first plurality of API data sources; and
quantifying an amount of overlap between the set of top terms and a combination of the seed words and synsets of the seed words;
wherein the deep learning model uses the amount of overlap in predicting the privacy trustworthiness level for the first API.

15. The computer-readable medium of claim 11, the operations further comprising:
storing multiple versions of the first plurality of API data sources, each of the multiple versions corresponding to a different point in time;
tracking changes in the first plurality of API data sources based on differences between the multiple versions; and
updating the privacy trustworthiness level of the first API based on the tracked changes to the first plurality of API data sources.

16. The computer-readable medium of claim 11, the operations further comprising:
receiving an identifier of a third API to be provided by a developer upon approval;
collecting a third plurality of API data sources related to the third API based on the identifier of the third API;
using the deep learning model, predicting the privacy trustworthiness level for the third API; and
enabling access to the third API based on the privacy trustworthiness level of the third API being above the threshold level.

17. The computer-readable medium of claim 16, the operations further comprising:
tracking historic values of the privacy trustworthiness level of the first API;
wherein the deep learning model uses the historic values of the privacy trustworthiness level of the first API to predict a future privacy trustworthiness level of the first API, the second API, or the third API.

18. The computer-readable medium of claim 11, the operations further comprising training the deep learning model, comprising:
providing extracted data from the first plurality of API data sources related to the first API for multiple points in time as training data;
obtaining rules related to types of data of the extracted data, the rules indicating how the types of data affect a privacy trustworthiness score;
performing bidirectional long short-term memory (bi-LSTM) deep learning on the extracted data for each of the multiple points in time to derive a first API privacy trustworthiness score for each of the multiple points in time;
combining the first API privacy trustworthiness scores for each of the multiple points in time; and
distributing the privacy trustworthiness scores across a plurality of privacy trustworthiness levels as representative privacy trustworthiness levels.

19. A system comprising:
one or more processors;
one or more non-transitory computer-readable media containing instructions, which when executed by the one or more processors, cause the system to perform operations comprising:
providing access to a first application programming interface (API) provided by a first party and a second API provided by a second party;
collecting a first plurality of API data sources related to the first API and a second plurality of API data sources related to the second API;
using a deep learning model, predicting a privacy trustworthiness level for the first API and the second API; and
disabling access to the first API based on the privacy trustworthiness level of the first API being below a threshold level.

20. The system of claim 19, the operations further comprising:
crawling a plurality of web pages related to the first API to collect the first plurality of API data sources;
wherein the plurality of web pages include at least one of a documentation page of documents explaining the first API, a page including terms of service of the first API, a page including terms of service of the first party, a news page mentioning the first API or the first party, and a stock website including a stock price of the first party.

* * * * *